United States Patent
Becheret

(10) Patent No.: US 11,635,524 B2
(45) Date of Patent: Apr. 25, 2023

(54) METHOD AND DEVICE FOR DETECTING A DECOY OPERATION OF A GNSS SYSTEM

(71) Applicant: SAFRAN ELECTRONICS & DEFENSE, Paris (FR)

(72) Inventor: Yves Becheret, Moissy-Cramayel (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 0 days.

(21) Appl. No.: 17/626,733

(22) PCT Filed: Jul. 10, 2020

(86) PCT No.: PCT/EP2020/069527
§ 371 (c)(1),
(2) Date: Jan. 12, 2022

(87) PCT Pub. No.: WO2021/009033
PCT Pub. Date: Jan. 21, 2021

(65) Prior Publication Data
US 2022/0244400 A1    Aug. 4, 2022

(30) Foreign Application Priority Data
Jul. 15, 2019 (FR) ...................................... 1907908

(51) Int. Cl.
*G01S 19/21* (2010.01)
*H04K 3/00* (2006.01)

(52) U.S. Cl.
CPC .............. *G01S 19/215* (2013.01); *H04K 3/65* (2013.01); *H04K 3/90* (2013.01); *H04K 2203/20* (2013.01)

(58) Field of Classification Search
CPC ............................................... G01S 19/21–215
See application file for complete search history.

(56) References Cited

U.S. PATENT DOCUMENTS

| 9,847,033 B1 | 12/2017 | Carmack et al. |
| 10,908,294 B2 * | 2/2021 | Lyusin .................. G01S 19/215 |

(Continued)

FOREIGN PATENT DOCUMENTS

CN         108693543 A        10/2018

OTHER PUBLICATIONS

Liu et al., "Impact Assessment of GNSS Spoofing Attacks on INS/GNSS Integrated Navigation System," Sensors 2018, 18, 1433, 20 pages.

*Primary Examiner* — Cassi J Galt
(74) *Attorney, Agent, or Firm* — Muncy, Geissler, Olds & Lowe, P.C.

(57) ABSTRACT

A method of detecting an operation to spoof a first positioning device carried by a first vehicle moving in a zone in which at least one second vehicle carrying a second positioning device is also moving, the method comprising the step of causing at least one first positioning value to be calculated for each vehicle from initial satellite signals received by each device; the method being characterized in that it further comprises the steps of: causing the second device to initiate a latching stage in order to make a new search for satellite signals and using the new satellite signals received by the second device to calculate a second positioning value for the second vehicle at the same instant as the first value; comparing the first and second values relating to the second vehicle; and issuing a warning when the two values do not coincide.

16 Claims, 2 Drawing Sheets

(56) References Cited

U.S. PATENT DOCUMENTS

| | | | |
|---|---|---|---|
| 11,194,052 B1* | 12/2021 | Kazmierczak | G01S 19/215 |
| 2019/0243002 A1* | 8/2019 | Song | B60Q 9/00 |

* cited by examiner

METHOD AND DEVICE FOR DETECTING A DECOY OPERATION OF A GNSS SYSTEM

The present invention relates to the field of navigation, and more particularly to positioning and navigating on the basis of receiving satellite signals transmitted by satellites forming part of a constellation of satellites distributed around the Earth. The main global navigation satellite systems (GNSS) for positioning or locating or navigating by satellite comprise the GPS, Galileo, GLONASS, and BeiDou systems.

BACKGROUND OF THE INVENTION

Satellite positioning consists in receiving signals transmitted by satellites in positions that are known, and in making use of the durations (or times of flight) between the transmission and the reception of each of the signals to deduce measurements of the so-called "pseudo-distances" between the receiver of the satellite signals (commonly and sometimes improperly referred to as a GPS receiver) and each of the satellites from which signal has been received (with each signal including in particular an identifier for the satellite and the time at which the signal was transmitted). Thus, it suffices to have available signals from four satellites in order to obtain the latitude, the longitude, and the altitude of the receiver, together with an error concerning the measured durations, with positioning accuracy increasing with increasing number of satellites from which signals have been taken into account by the receiver in order to calculate its position.

As a result, such positioning systems, which are relatively accurate, have become widespread, and nowadays many vehicles are fitted with satellite signal receivers. As a result of the reduction in the cost of satellite signal receivers, most people also have smartphone-type mobile telephones, which have their own satellite signal receivers.

In parallel with such development of satellite signal receivers, spoofing devices have appeared in order to "spoof" such satellite signal receivers.

Such a device comprises an electronic processor unit connected to a radio signal transmitter for transmitting fraudulent signals having the characteristics of satellite signals. More precisely, the electronic processor unit is arranged to start from the real initial position of a satellite signal receiver and to prepare fraudulent signals that lead to the satellite signal receiver calculating an erroneous position, on being taken into account by the satellite signal receiver. By way of example, the real initial position of the satellite signal receiver may be detected by means of a laser rangefinder system or it may be communicated by the vehicle carrying the satellite signal receiver, as is required by certain navigation rules, in particular for use in the air and at sea (automatic dependent surveillance-broadcast (ADSB) or automatic identification system (AIS) signals transmitted by vehicles to communicate their positions to their neighbors).

In order to cause the fraudulent signals to be taken into account by a satellite signal receiver, it is not sufficient to transmit the fraudulent signals at power greater than the power of the original satellite signals. It is also necessary for the fraudulent signals to have the same code phase and a Doppler effect lying in the same range as applied to the satellite signals that were previously being received by the satellite signal receiver. Providing the first received fraudulent signal is consistent with the latest position calculated by the satellite signal receiver and with the previously received satellite signals, and providing the fraudulent signals that are received subsequently are consistent with one another, then the fraudulent signals will be used by the satellite signal receiver as though they were true satellite signals, and it will not be possible to detect the error concerning the real position of the satellite signal receiver.

By way of example, spoofing is explained in the Document «Impact Assessment of GNSS Spoofing Attacks on INS/GNSS Integrated Navigation System», Yang Liu et al., Sensors 2018, 18, 1433, doi:10.3390/s18051433.

Hybrid navigation systems are also known that combine inertial positioning data coming from an inertial navigation system with satellite positioning data coming from a satellite signal receiver. Such navigation systems incorporate one or more Kalman filters arranged to recalibrate the hybrid navigation on the satellite positioning data. The Kalman filter is protected by an innovation test that detects outlier measurements and rejects them, such that providing the fraudulent signals are sufficiently consistent with one another, they can satisfy the innovation test. In such systems, the satellite positioning data serves to compensate for long-term errors in the inertial positioning data such that taking account of the fraudulent signals will lead to navigation error in spite of the inertial positioning data being combined with the satellite positioning data.

It can thus be understood that the use of such spoofing devices can be harmful to the safety of a spoofed vehicle and possibly also to the safety of other vehicles moving in the same zone as the spoofed vehicle.

OBJECT OF THE INVENTION

A particular object of the invention is to provide means for detecting a spoofing operation.

SUMMARY OF THE INVENTION

To this end, according invention, there is provided a method of detecting an operation to spoof a first satellite signal positioning device carried by a first vehicle moving in a zone in which at least one second vehicle carrying a second satellite signal positioning device is also moving, the method comprising the step of causing at least one first positioning value to be calculated for each vehicle from initial satellite signals received by each device; the method being characterized in that it further comprises the steps of:

in parallel both with receiving initial satellite signals by the second device and also with calculating the first value for the second vehicle, causing the second device to initiate a latching stage in order to make a new search for satellite signals and using the new satellite signals received by the second device to calculate a second positioning value for the second vehicle at the same instant as the first value;

comparing the first and second values relating to the second vehicle; and issuing a warning when the two values do not coincide.

The term "positioning value" is used to cover a position and/or a speed. Thus, the vehicles moving in a zone covered by a spoofing operation, but without being the target of the spoofing operation, are capable of detecting that a spoofing operation is taking place and of issuing a warning to warn the crew of the vehicle being spoofed.

There is also provided a method as described above, wherein the warning is issued when the compared values differ by a difference greater than a predetermined threshold.

There is also provided a method as described above, wherein the threshold is determined while taking account of statistical accuracy both for calculating the first value and also for calculating the second value when not in a spoofing situation.

There is also provided a method as described above, wherein the warning is issued by broadcast transmission.

There is also provided a method as described above, wherein the warning is issued to a ground station.

There is also provided a method as described above, wherein the ground station sends a warning message to the vehicle being spoofed.

There is also provided a method as described above, wherein the first value is also calculated using non-satellite positioning data.

There is also provided a method as described above, wherein a plurality of second vehicles are moving in the zone and the method includes the step of estimating an outline of the spoofing zone from the first values of the second vehicles.

There is also provided a method as described above, including the step of estimating a position for a transmitter of spoofing signals from the outline of the spoofing zone.

There is also provided a satellite signal positioning device for performing the above-described method, the device having at least first and second satellite signal reception channels and at least one processor unit arranged:
  during a latching mode to select transmitters of satellite signals on the first channels that are sufficiently powerful to be used, and during an operating mode that lasts for as long as the signals transmitted by the selected transmitters are sufficiently powerful, to calculate successive first positioning values from said signals; and
  during a latching mode to select transmitters of signals on the second channels that are sufficiently powerful to be used, and during an operating mode, to calculate at least one second positioning value from said signals, the processor unit returning automatically to latching mode after calculating said at least one positioning value on the second channels regardless of the power of the signals.

There is also provided a device as described above, wherein the processor unit returns to latching mode on the second channels after calculating a single positioning value.

There is also provided a device as described above, wherein the processor unit returns to latching mode on the second channels after a predetermined duration.

There is also provided a device as described above, wherein the first channels belong to a first receiver and the second channels belong to a second receiver.

There is also provided a device as described above, wherein the first and second channels belong to a single receiver.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

Figure 1:
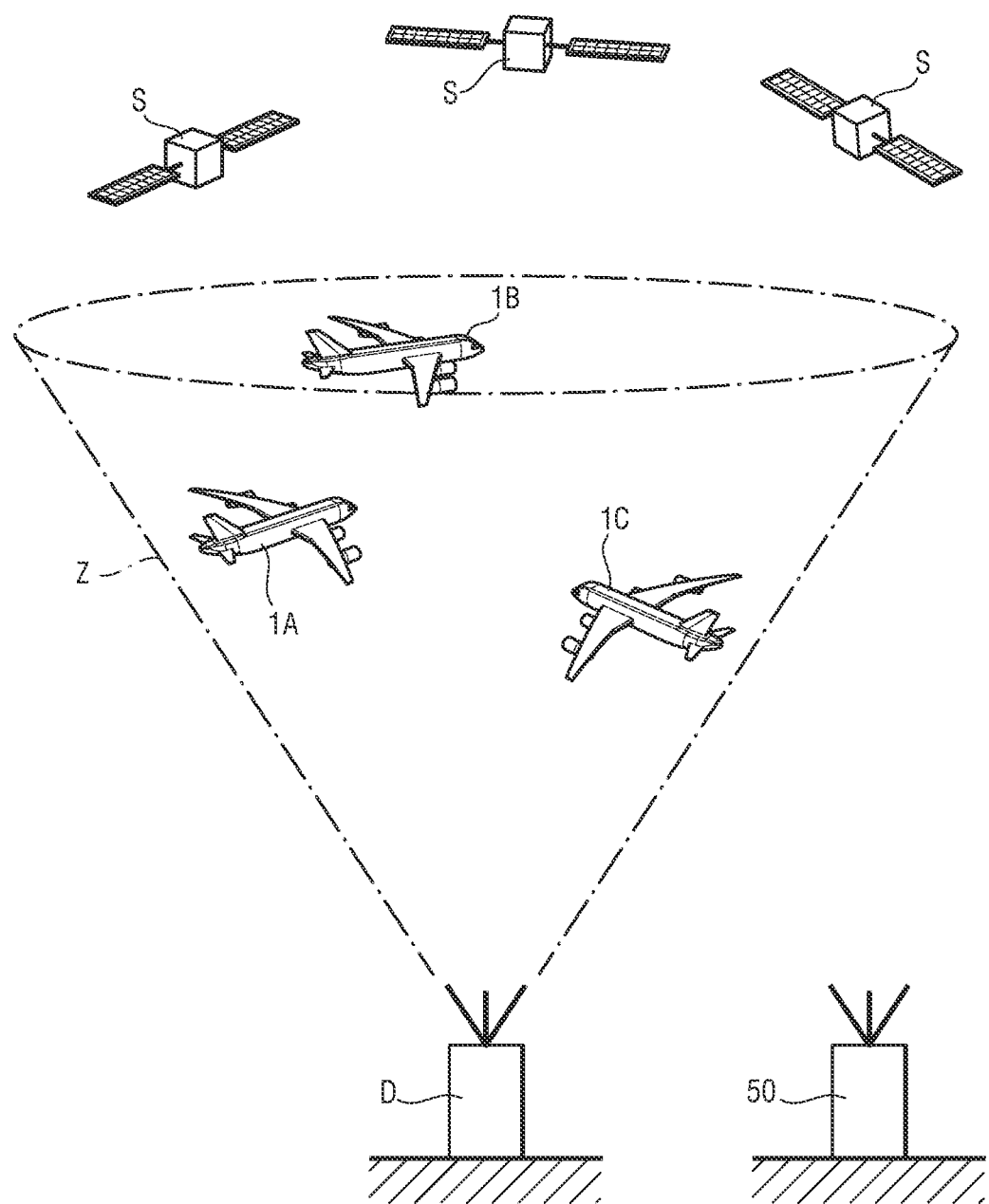
FIG. 1 is a diagrammatic view of a spoofing device creating a spoofing zone in which aircraft are flying.
Figure 2:
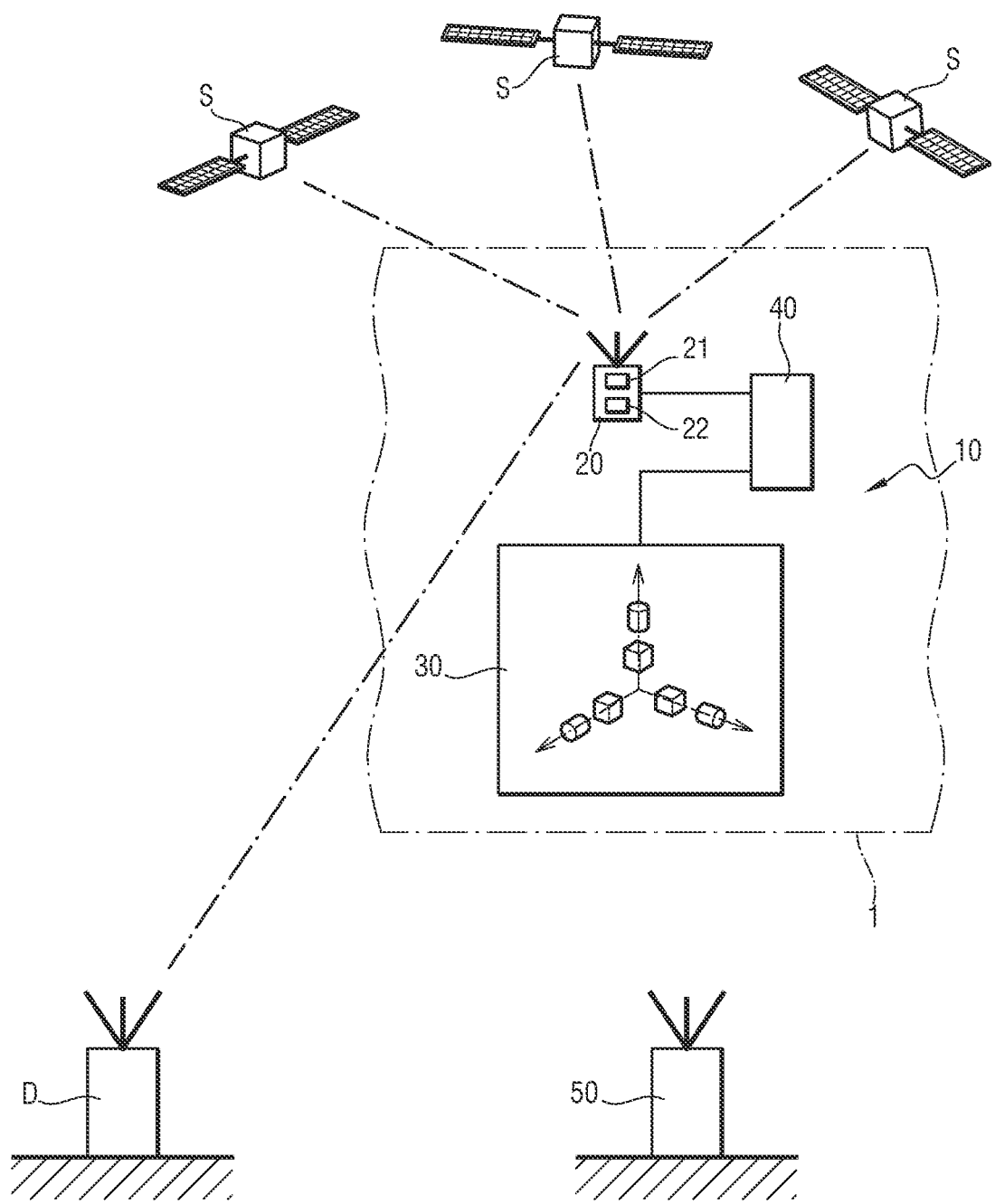
FIG. 2 is a diagrammatic view of a detector device for performing the method of the invention during a spoofing operation.

With reference to the figures, the invention is described herein for aircraft 1A, 1B, and 1C, each fitted with a navigation system given overall reference 10 that comprises a satellite signal positioning device 20 and an inertial navigation system 30, which are connected to an electronic navigation unit 40.

In a first embodiment, the device 20 comprises a first satellite signal receiver 21 and a second satellite signal receiver 22.

In conventional manner, the first receiver 21 is arranged, in operation, to receive satellite positioning signals transmitted by satellites S in a satellite constellation of at least one global navigation satellite system (GNSS) such as GPS, Galileo, GLONASS, or BeiDou, and to use the satellite signals to calculate first satellite positioning data such as latitude, longitude, altitude, and timing error.

In conventional manner, the second receiver 22 is arranged, in operation, to receive satellite positioning signals transmitted by satellites S in a satellite constellation of at least one global navigation satellite system (GNSS) such as GPS, Galileo, GLONASS, or BeiDou, and to use the satellite signals to calculate second satellite positioning data such as latitude, longitude, altitude, and timing error.

Both of the receivers 21 and 22 possess a conventional latching mode in which they receive signals and select from among them those satellite signals that are sufficiently powerful to enable them to be used. In an operating mode, the receivers 21 and 22 ignore those signals that do not correspond to the satellite signals initially selected in the latching mode. In practice, the receivers 21 and 22 take account only of satellite signals that have the same code sequences as the initially selected satellite signals. The code sequence of each satellite signal corresponds to an identifier of the satellite that transmitted the satellite signal. The receivers 21 and 22 also verify consistency between:
  the Doppler effect of the signals successively received in operating mode;
  the phase of the signals successively received in operating mode; and
  the frequency of the signals successively received in operating mode.

The inertial navigation system 30 comprises an inertial measurement unit having inertial sensors, which in this example and in conventional manner are three accelerometers arranged on the axes of a measurement reference frame and three gyros arranged to measure rotations of the measurement reference frame relative to a reference frame. In conventional manner, the inertial measurement system 30 further comprises a processor unit arranged to determine inertial positioning data, such as attitude and speed data, from the measurement signals produced by the inertial sensors.

The electronic navigation unit 40 comprises one or more processors and a memory containing at least one program containing instructions for performing the method of the invention. In particular, the electronic navigation unit 40 is programmed to perform navigation calculations by using the positioning data.

On executing this program, the electronic navigation unit 40 performs hybridized navigation calculations on the basis both of the inertial positioning data and of the first satellite positioning data. Hybridized navigation may be based on using position coupling or speed coupling. To perform hybridizing, the program implements a Kalman filter that comprises a bank of filters and that is protected by an innovation test seeking to verify self consistency of the first satellite positioning data. The innovation test is itself known and it serves to detect outlier measurements and to reject them.

In order to monitor the self consistency of the data, the navigation system 10 performs conventional integrity verification processes such as receiver autonomous integrity monitoring (RAIM) or aircraft autonomous integrity monitoring (AAIM).

The method of invention seeks to detect a spoofing operation in which a spoofing device D, on the ground in this example, and knowing the real position of the aircraft 1, transmits fraudulent signals that are to be received by the satellite signal receiver 20 and that are to be taken into account when performing the hybrid navigation calculations, taking the place of the authentic satellite signals, so as to cause the aircraft 1 to follow a real path that is different from the path being indicated by the navigation system. It can be understood that the fraudulent signals can be intended for only one of the aircraft 1A, 1B, or 1C flying in the fraudulent signal transmission zone Z, since the fraudulent signals need to be prepared as a function of the position and of the speed of the aircraft being spoofed: in the present description, it is assumed that the target of the spoofing operation is the aircraft 1A. The structure and the operation of the spoofing device D are themselves known and are not described in greater detail herein.

In practice, the navigation system 10 in each of the aircraft 1A, 1B, and 1C performs hybrid first navigation calculations on the satellite positioning data supplied by the first receiver 21 in operating mode and on the inertial positioning data supplied by the inertial system 30. These navigation calculations serve to supply first position values and first speed values at regular intervals, the first position and speed values being used to cause the aircraft to follow a path. To do this, the first receiver 21 is put into latching mode initially and then into operating mode, and it remains in operating mode so long as the number of satellite signals that can be used by the first receiver 21 is sufficient to determine satellite positioning data of accuracy corresponding to the looked-for positioning accuracy. This is generally referred to as "tracking" the signal from each satellite, as contrasted to the "searching" stage.

In the method of the invention, the second receiver 22 is switched to alternate between latching mode and operating mode. The purpose of switching back and forth between these two modes is to force the second receiver 22 to lock frequently on new satellite signals so as to make the second receiver 22 sensitive to the fraudulent signals. The navigation system 10 in each of the aircraft 1A, 1B, and 1C performs non-hybrid second navigation calculations on the second satellite positioning data supplied by the second receiver 22 in operating mode. This navigation calculation serves to supply second position values and second speed values that are used for detection of the spoofing operation. It can be understood that detecting the spoofing operation is more effective when the second receiver 22 is in operating mode for periods of shorter duration. Preferably, the second receiver 22 returns to latching mode as soon as it has been possible to calculate a position value in operating mode. In a variant, it is possible to define the duration for which the second receiver 22 remains in operating mode, or to define a frequency for alternating between modes.

Thus, still assuming that the target of the spoofing operation is the aircraft 1A, it can be understood that:

the fraudulent signals will take the place of the satellite signals being used both by the first receiver 21 and by the second receiver 22 of the aircraft 1A such that the first position value coincides with the second position value and the first speed value coincides with the second speed value; and the fraudulent signals, which are prepared on the basis of the position and the speed of the aircraft 1A, do not correspond to the satellite signals selected by the first receivers 21 of the aircraft 1B and 1C while in operating mode, but will be selected by the second receivers 22 of the aircraft 1B and 1C while in latching mode and will be used by the second receivers 22 of the aircraft 1B and 1C while in operating mode such that in each of those aircraft the first position value does not coincide with the second position value and the first speed value does not coincide with the second speed value.

In each of the aircraft 1A, 1B, and 1C, if the comparison between the first position value and the second position value and/or between the first speed value and the second speed value reveals a difference, then a spoofing operation is in progress.

More precisely, the difference is compared with a predetermined threshold, and it is only if the difference exceeds the predetermined threshold that the electronic navigation unit considers that a spoofing operation is in progress. The comparison threshold is determined while taking account of the statistical accuracy of the first and second navigation calculations (geometrical dilution, signal-in-space error statistics, and transmission error statistics) while not in a spoofing situation.

In each of the aircraft 1A, 1B, and 1C, it is important to understand that the comparison between the first position value and the second position value and/or between the first speed value and the second speed value makes it possible to reveal a spoofing operation only when it is not being applied to said aircraft 1A, 1B, 1C.

The method of the invention thus includes a step of transmitting a warning when the two compared values do not coincide. By way of example, the warning is transmitted by using a radar transponder or a radio transmitter or any other appropriate data transmission mode.

The warning may be broadcast and/or it may be transmitted to an air traffic control ground station 50 that is arranged to send a warning message aircraft that is being spoofed.

The warning message may optionally be sent after being confirmed by the aircraft in flight that are not being targeted. The warning message may be sent to all of the aircraft in the zone, or else more specifically to the aircraft that is being spoofed.

Advantageously, the ground station 50 is also arranged to estimate the extent of the zone Z and to determine the position of the spoofing device D, which presents relatively high probability of being located substantially in the center of the zone Z. It can be understood that the greater the number of aircraft located in the zone Z and in its vicinity, the better the estimation of the outline of the zone Z (with the boundaries of the zone lying between those vehicles that are returning a warning and vehicles, other than the spoofed vehicle, that are not returning a warning).

In order to enable the ground station 50 to perform more complete analysis of the spoofing situation, additional information may be transmitted by the aircraft 1 to the ground station 50, e.g. so that the ground station can transmit warnings and possibly trigger corrective measures. The following information may be mentioned:

references of the aircraft (identifier, flight number, type);
the first position value;
the horizontal protection limits (HPL) and the vertical protection limits (VPL) associated with the first position value;
the second position value;
the time;
the list PRN and the values CNO of the channels supplying the signals used for calculating the second position value;
the north-south, east-west, and vertical speeds; and
the attitude and the heading of the aircraft.

In a second embodiment of the receiver 20, the device 20 has a single satellite receiver having a plurality of channels. These channels are the channels for processing the received signal after initial demodulation and digitizing at intermediate frequency. This gives:
a first fraction of the channels that are allocated to the signals coming from the satellites that were selected during the latching mode and that are used for the operating stage and for calculating the first values; and
a second fraction of the channels that are allocated to alternating quickly between latching mode and operating mode in order to supply the signals that are used for calculating the second values.

It can thus be understood that:
the first fraction of the channels are used for performing the functions of the receiver 21 and for calculating the first position value; and
the second fraction of the channels are used for performing the functions of the receiver 22 and for calculating the second position value.

The method of the invention is performed in the same manner as with the device 20 in the first embodiment.

It should be observed that for the first channels, the latching mode is assisted by the position and speed information as supplied by an inertial navigation system or as prepared internally from the other channels that are tracking, thereby greatly reducing any possibility of latching onto the spoofing signal corresponding to the code of the satellite dedicated to the channel. In general, this corresponds to the "normal" operation of a GPS receiver.

In contrast, for the second channels, the latching mode is not assisted by the position and speed information (whether coming from an inertial navigation system or prepared internally), thus facilitating "latching" on the spoofing signal by power detection with the speeds and code phase corresponding to the spoofing signal.

Naturally, the invention is not limited to the embodiments described and covers any variant coming within the ambit of the invention as defined by the claims.

In particular, the navigation system of the vehicle could be different from that described.

The vehicle may be provided with a plurality of inertial systems, each navigating independently of the other(s).

The navigation system could operate on the basis of satellite data only or it could be hybridized to take account also of different non-satellite positioning data or of no inertial positioning data. The navigation system may comprise an inertial navigation system, or a direction finder system, or an optical navigation system operating on the basis of the positions of stars or of landmarks, or any combination of such equipment. The navigation system may also include a barometric altimeter.

In a variant, the warning may be transmitted directly to the aircraft 1A being spoofed. Specifically, the aircraft 1B and 1A can determine that it is the aircraft 1A that is being spoofed, since the position that it is transmitting in conventional manner by means of the ADSB signal corresponds, in each of the aircraft 1B and 1C, to the second position.

The invention applies to any type of vehicle, such as water, air, or land vehicles.

The invention claimed is:

1. A method of detecting an operation to spoof a first satellite signal positioning device carried by a first vehicle moving in a zone in which at least one second vehicle carrying a second satellite signal positioning device is also moving, the method comprising:
    causing at least one first positioning value to be calculated for each vehicle from initial satellite signals received by each satellite signal positioning device;
    in parallel both with receiving initial satellite signals by the second satellite signal positioning device and also with calculating the first positioning value for the second vehicle, causing the second satellite signal positioning device to initiate a latching stage in order to make a new search for satellite signals and using new satellite signals received by the second satellite signal positioning device to calculate a second positioning value for the second vehicle at the same instant as the first value;
    comparing the first and second positioning values relating to the second vehicle; and
    issuing a warning when the two positioning values do not coincide;
at least the second satellite signal positioning device having at least first satellite signal reception channels and second satellite signal reception channels and at least one processor unit arranged:
    during a latching mode to select transmitters of satellite signals on the first channels that are sufficiently powerful to be used, and during an operating mode that lasts for as long as the signals transmitted by the selected transmitters are sufficiently powerful, to calculate successive first positioning values from said signals; and
    during a latching mode to select transmitters of signals on the second channels that are sufficiently powerful to be used, and during an operating mode, to calculate at least one second positioning value from said signals, the processor unit returning automatically to latching mode after calculating said at least one positioning value on the second channels regardless of the power of the signals.

2. The method according to claim 1, wherein the warning is issued when the compared positioning values differ by a difference greater than a predetermined threshold.

3. The method according to claim 2, wherein the threshold is determined while taking account of statistical accuracy both for calculating the first positioning value and for calculating the second positioning value when not in a spoofing situation.

4. The method according to claim 1, wherein the warning is issued by broadcast transmission.

5. The method according to claim 1, wherein the warning is issued to a ground station.

6. The method according to claim 5, wherein the ground station sends a warning message to the first vehicle.

7. The method according to claim 1, wherein the first positioning value is also calculated using non-satellite positioning data.

8. The method according to claim 1, wherein a plurality of second vehicles are moving in the zone and the method includes the step of estimating an outline of the spoofing zone from the first positioning values of the second vehicles.

9. The method according to claim 8, including the step of estimating a position for a transmitter of spoofing signals from the outline of the spoofing zone.

10. The method according to claim 1, wherein the processor unit returns to latching mode on the second channels after calculating a single positioning value.

11. The method according to claim 1, wherein the processor unit returns to latching mode on the second channels after a predetermined duration after having calculated calculating said at least one positioning value on the second channels regardless of the power of the signals.

12. A satellite signal positioning device having at least first satellite signal reception channels and second satellite signal reception channels and at least one processor unit arranged:

during a latching mode to select transmitters of satellite signals on the first channels that are sufficiently powerful to be used, and during an operating mode that lasts for as long as the signals transmitted by the selected transmitters are sufficiently powerful, to calculate successive first positioning values from said signals; and during a latching mode to select transmitters of signals on the second channels that are sufficiently powerful to be used, and during an operating mode, to calculate at least one second positioning value from said signals, the processor unit returning automatically to latching mode after calculating said at least one positioning value on the second channels regardless of the power of the signals;

to compare the second positioning value and the corresponding first positioning values; and to issue a warning when the two positioning values do not coincide.

13. The device according to claim 12, wherein the processor unit returns to latching mode on the second channels after calculating a single positioning value.

14. The device according to claim 12, wherein the processor unit returns to latching mode on the second channels after a predetermined duration.

15. The device according to claim 12, wherein the first channels belong to a first receiver and the second channels belong to a second receiver.

16. The device according to claim 12, wherein the first and second channels belong to a single receiver.

* * * * *